United States Patent [19]
Hui

[11] Patent Number: 6,113,090
[45] Date of Patent: Sep. 5, 2000

[54] DOOR TRIM PANELS REST BLOCK

[75] Inventor: Anna Hui, Rochester Hills, Mich.

[73] Assignee: DaimlerChrysler Corporation, Auburn Hills, Mich.

[21] Appl. No.: 09/395,387

[22] Filed: Sep. 13, 1999

[51] Int. Cl.[7] .................................................. B23Q 3/00
[52] U.S. Cl. .......................................... 269/296; 269/902
[58] Field of Search .................................. 269/296, 902, 269/289 R, 58, 905

[56] References Cited

U.S. PATENT DOCUMENTS

| | | |
|---|---|---|
| 4,050,671 | 9/1977 | Coleman . |
| 4,180,252 | 12/1979 | Cushenbery . |
| 4,538,796 | 9/1985 | Steck . |
| 4,924,843 | 5/1990 | Waren ..................................... 269/902 |
| 4,930,213 | 6/1990 | Hayakawa et al. . |
| 5,009,406 | 4/1991 | McDermott . |

*Primary Examiner*—David A. Scherbel
*Assistant Examiner*—Daniel G. Shanley
*Attorney, Agent, or Firm*—Lawrence J. Shurupoff

[57] ABSTRACT

Apparatus for supporting a primary automotive door panel and door trim panel during a manufacturing process includes at least one rest block. The rest block has a rocker provided with first and second arms extending radially outwardly from a pivot axis at an angle to one another and perpendicular to the pivot axis such that adjacent surfaces of the arms form a radially outwardly opening recess. The rocker is supported for pivotal movement from a loading position in which the recess opens laterally to a work-supporting position in which the recess opens upwardly. The inner surfaces of the arm meet adjacent to the pivot axis to define a notch adapted to support a lower edge portion of the primary door panel when the rocker is in the work-supporting position. One of the arms has a shelf adapted to support the trim panel when the rocker is in the work-supporting position. The other arm carries a roller made of a soft, non-abrasive material such as rubber or plastic.

12 Claims, 4 Drawing Sheets

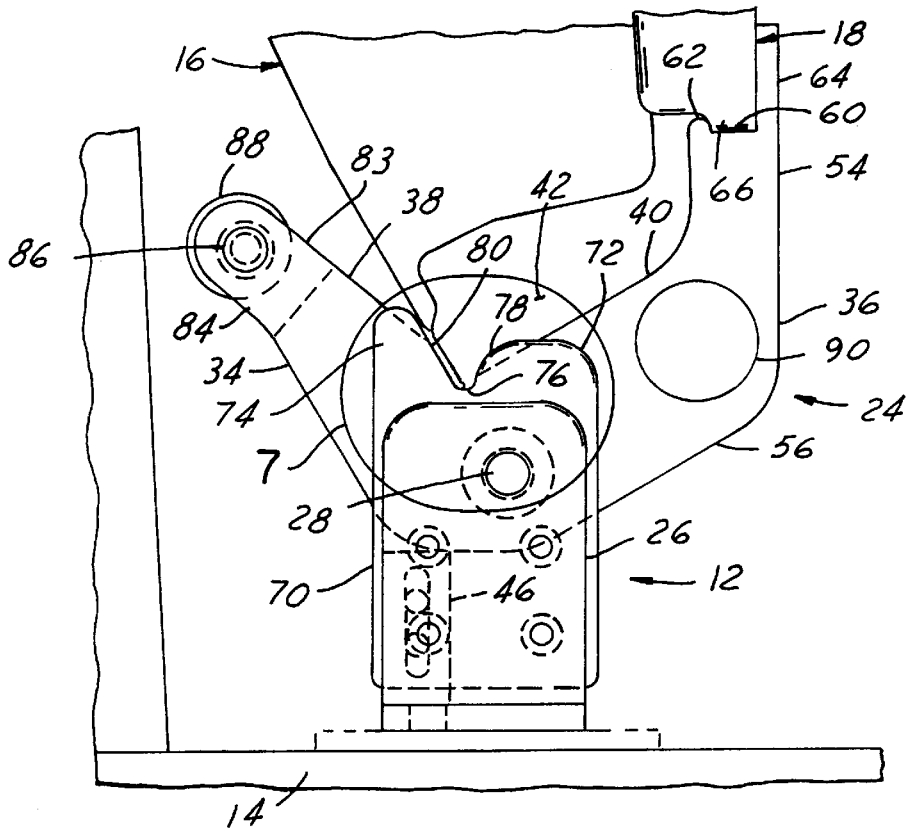
FIG. 3
FIG. 4
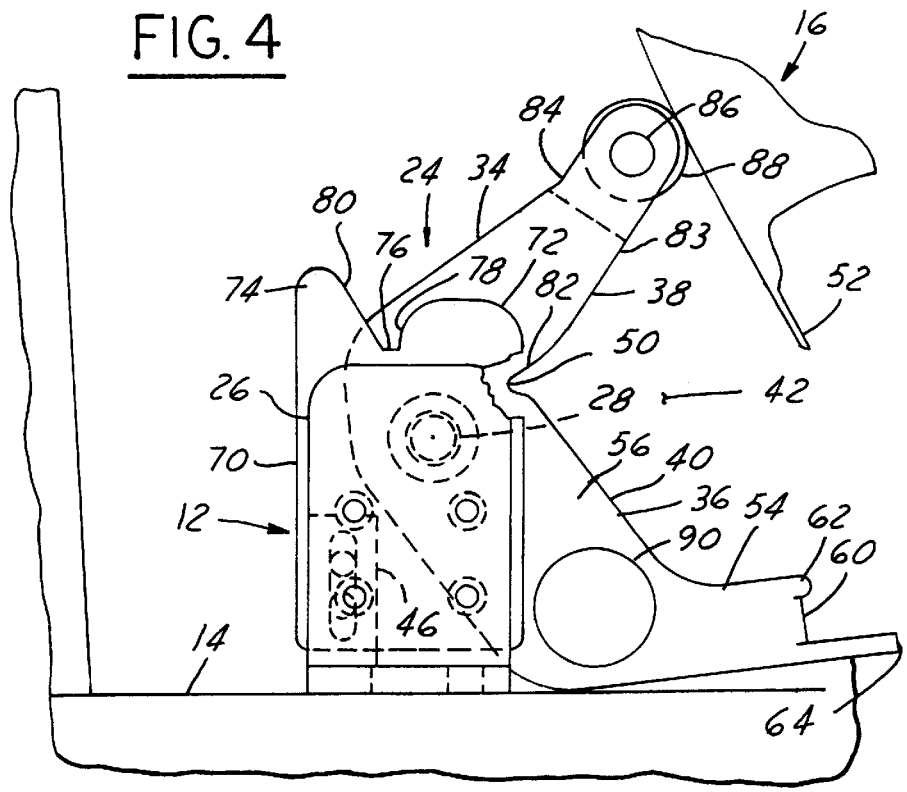

DOOR TRIM PANELS REST BLOCK

This invention relates generally to supports for use in the manufacture and assembly of doors and door trim panels and more particularly to a door and door trim panel rest block.

BACKGROUND OF THE INVENTION

In the manufacture and assembly of automotive vehicle doors, a door trim panel must be installed on each sheet metal door panel. During the process, a sheet metal door panel is supported on a moving carrier. At a workstation along the path of the carrier, an operator places the door trim panel against the sheet metal door panel and must hold the door trim panel with one hand while installing various components including a linkage rod and a wire harness, with the other hand. The operator also must apply fasteners to secure the trim panel to the sheet metal door panel.

In the past it has been difficult for the operator to accomplish all this in the very short time before the door is moved on to the next workstation. What is needed is some means for holding both the sheet metal door panel and the door trim panel while the operator is making the various connections and installations.

SUMMARY OF THE INVENTION

In accordance with the present invention, the sheet metal door panel and door trim panel are mounted on at least one and preferably two rest blocks. The rest blocks are preferably attached to a moving door carrier which moves from one station to another during the manufacturing process.

Preferably each rest block includes a rocker having arms which extend radially outwardly from a common pivot axis at an angle to one another such that the adjacent inner surfaces of the arms form a generally radially outwardly opening recess. The rocker is supported for pivotal movement about its pivot axis from a loading position in which the recess opens laterally to a work-supporting position in which the recess opens upwardly. The inner surfaces of the arms meet adjacent to the pivot axis to define a notch adapted to support a lower edge portion of the door panel when the rocker is in the work-supporting position. One of the arms has a shelf adapted to support the trim panel when the rocker is in the work-supporting position. The door panel and door trim panel are thus supported generally upright in an ergonomically friendly position to facilitate installation of the various components.

The sheet metal panel is loaded onto the rockers when the rockers are in the loading position, with the rocker recesses facing laterally outwardly. In this position, one of the arms of each rocker is in a lower substantially horizontal position, while the other arm projects upwardly so that when the sheet metal door panel is moved laterally into position to be supported on the rocker, it engages the upwardly extending arm and causes the rocker to pivot so that the recess faces upwardly and the lower edge portion of the door is supported in the notch. Preferably the upwardly extending arm contacted by the sheet metal door panel during loading has a cushioning upper edge portion, which may be in the form of a rubber or plastic roller, to avoid damaging or marring the door panel.

The rockers are weighted so that they normally assume the loading position.

One object of this invention is to provide a rest block or blocks for supporting a door panel and door trim panel having the foregoing features and capabilities.

Another object is to provide a rest block which is composed of a relatively few simple parts, is rugged and durable in use, and is relatively inexpensive to manufacture and easy to operate.

These and other objects, features and advantages of the invention will become more apparent as the following description proceeds, especially when considered with the accompanying drawings.

BRIEF DESCRIPTION OF THE DRAWINGS

FIG. 3 is a view taken on the line 3—3 in FIG. 1.

FIG. 4 is a view similar to FIG. 3 but shows the parts in a different position.

DETAILED DESCRIPTION OF THE PREFERRED EMBODIMENT

Figure 1:
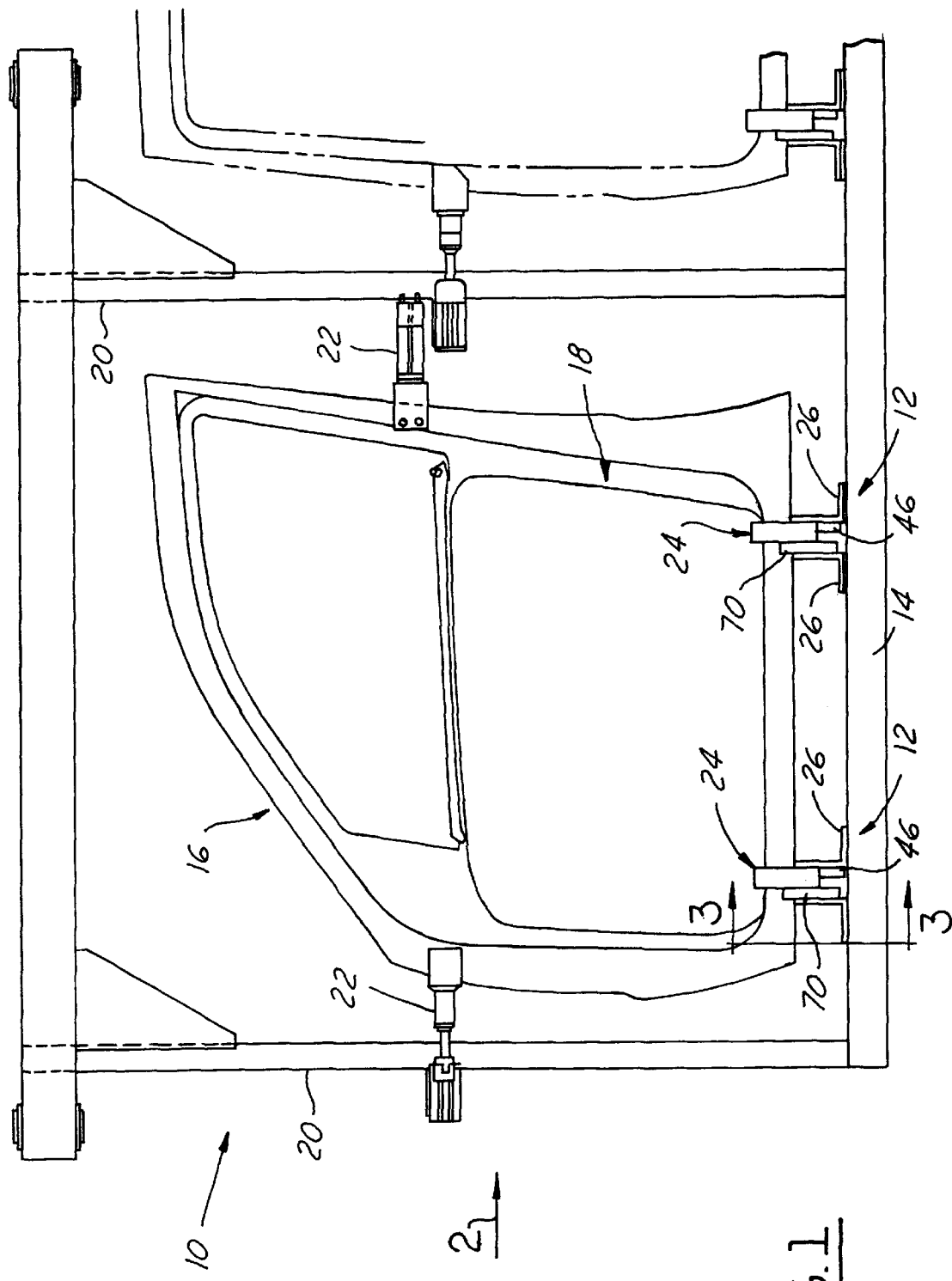
FIG. 1 is a side elevational view showing a sheet metal door panel and door trim panel supported on rest blocks constructed in accordance with this invention, the rest blocks being mounted on a movable door carrier.

Referring now more particularly to the drawings, there is shown a door carrier 10 which is movable horizontally along a predetermined path past one or more workstations. Two identical rest blocks 12 are mounted in laterally spaced apart relation on a horizontal bottom frame member 14 of the carrier 10. The rest blocks 12 are adapted to support a door panel 16, hereinafter sometimes referred to as a "sheet metal door panel" or "primary door panel," and a door trim panel 18. The primary door panel 16 is seen as also being clamped to uprights 20 of the carrier 10 by clamps 22 which form no part of this invention.

Each rest block 12 includes a rocker 24 between support brackets 26 rigidly mounted on the bottom frame member 14 of the carrier 10. The brackets 26 are laterally spaced apart and support the rocker for pivotal movement on a horizontal pivot pin 28. The pivot pins 28 of the two rest blocks 12 are aligned with one another.

Each rocker 24 has arms 34 and 36 which extend radially outwardly from the axis of the pivot pin 28 at an angle to one another and perpendicular to the pivot pin. The adjacent inner surfaces 38 and 40 of the arms 34 and 36 form a radially outwardly opening recess 42. The rocker 24 is capable of pivoting about the pivot pin 28 from a work-supporting position shown in FIG. 3 to a loading position shown in FIG. 4. A stop 46 of a suitable material such, for example, as polyurethane, is secured to one of the brackets 26. The stop 46 is adapted to be engaged by the inner end portion of the rocker arm 34 to prevent pivotal movement of the rocker 24 beyond the work-supporting position of FIG. 3. The arm 36 engages the bottom frame member 14 of the carrier to prevent pivotal movement of the rocker 24 beyond the loading position of FIG. 4. In the loading position, the arm 34 extends upwardly and the arm 36 extends downwardly and then generally horizontally so that the recess 42 opens laterally outwardly. The range of pivotal movement of the rocker is preferably between 120° and 140°.

The inner surfaces 38 and 40 of the arms 34 and 36 meet adjacent to the inner ends of the arms and adjacent to the pivot pin 28 to define a notch 50. The notch 50 is adapted to support a lower edge portion 52 of the primary door panel 16 as shown In FIG. 3 when the rocker 24 is in the work-supporting position of FIG. 3. The arm 36 of the rocker has an outer end portion 54 which is turned somewhat relative to the inner end portion 56 of the arm so as to extend substantially vertically when the rocker is in the work-supporting position of FIG. 3. The outer extremity of the outer end portion 54 of the arm 36 has a shelf 60 for supporting the door trim panel 18 in contact with the primary door panel 16. Extensions 62 and 64 of the outer end portion 54 are spaced apart and project radially outwardly from the shelf 60 to locate the lower edge portion 66 of the door trim panel when supported thereon.

A stationary support 70 is positioned alongside the rocker 24 between the rocker and one of the brackets 26. The top of the stationary support 70 has an upwardly extending front lobe 72 and upwardly extending rear lobe 74 with a notch 76 between the lobes. The lobes 72 and 74 have surfaces 78 and 80 which extend upwardly and flare outwardly from the notch 76. The notch 76 registers with the notch 50 in the rocker 24 when the rocker is in the work-supporting position of FIG. 3 to assist the rocker in supporting the lower edge portion 52 of the primary door panel 16.

The inner surface 38 of the arm 34 of the rocker has an inner portion 82 which extends radially outwardly from the notch 50, and an outer portion 83 which flares at a greater angle toward the outer extremity thereof. The outer extremity of the arm 36 has laterally spaced extensions 84 supporting an axle 86 on which a cushion roller 88 is supported for rotation. The axle 86 is parallel to the pivot pin 28. The cushion roller 88 may be made of rubber or plastic or a similar relatively soft non-abrasive material which will not damage or mar the surface of the primary door panel 16.

When not supporting a door panel, the rocker 24 will assume the loading position of FIG. 4 because of a weight 90 carried by the arm 36 which biases the rocker to this position.

A primary door panel 16 is loaded onto the rest blocks 12 by being moved horizontally and laterally, from right to left in FIG. 1, while the rockers are in the loading position, with the lower portion of the outer surface of the primary door panel engaging the rollers 88 as shown in FIG. 4 and pushing the rockers to the work-supporting position of FIG. 3. The primary door panel will then be lowered so that its lower edge portion 52 will engage in the notch 50 and mid-portions of the door panel will be stabilized by the clamps 22 which can be manually or automatically applied. The lower edge portion 52 of the primary door panel 16 will also be supported in the notch 76 of the stationary support 70, being guided into notch 76 by the surfaces 78 and 80 of the stationary support. The primary door panel 16 may be loaded either manually or by a loading machine. When the primary door panel is thus supported in generally upright position with its lower edge portion in the notch 50 of the rocker and in the notch 76 of the stationary support 70, the outer surface of the primary door panel engages the inner portion 82 of the surface 38 of the rocker arm 34 but the upper part of the rocker arm is spaced away from the primary door panel as shown in FIG. 3. The arm 36 is spaced from the primary door panel. Thus only a small portion of the outer surface of the primary door panel adjacent its lower edge is contacted by the rocker when thus supported, and even the cushioned roller 88 is spaced away from the door panel at this time.

Figures 2, 7:
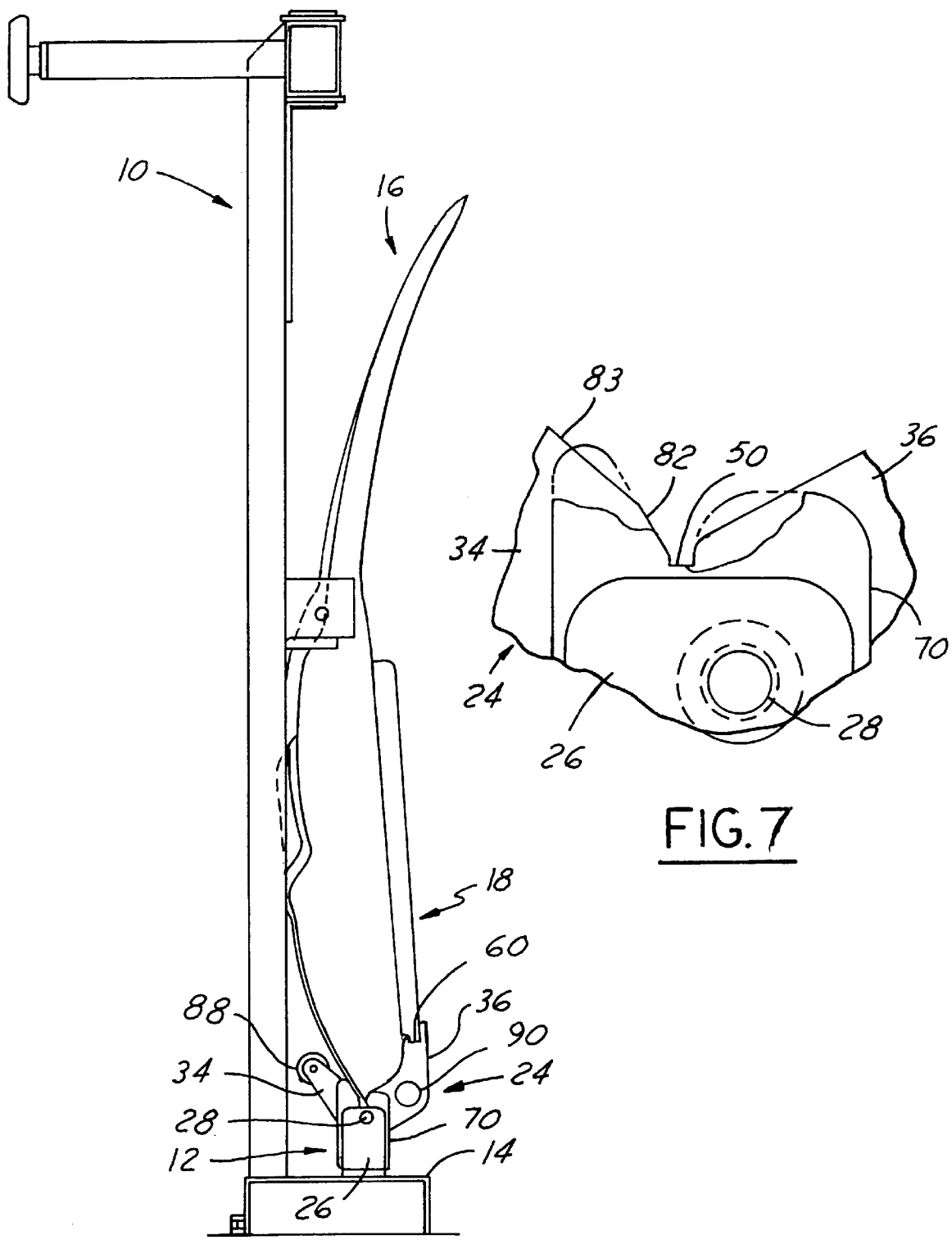
FIG. 2 is a side view looking in the direction of the arrow 2 in FIG.
FIG. 7 is an enlarged fragmentary view of a portion of the rest block shown within the circle 7 in FIG. 3.
Figure 5:
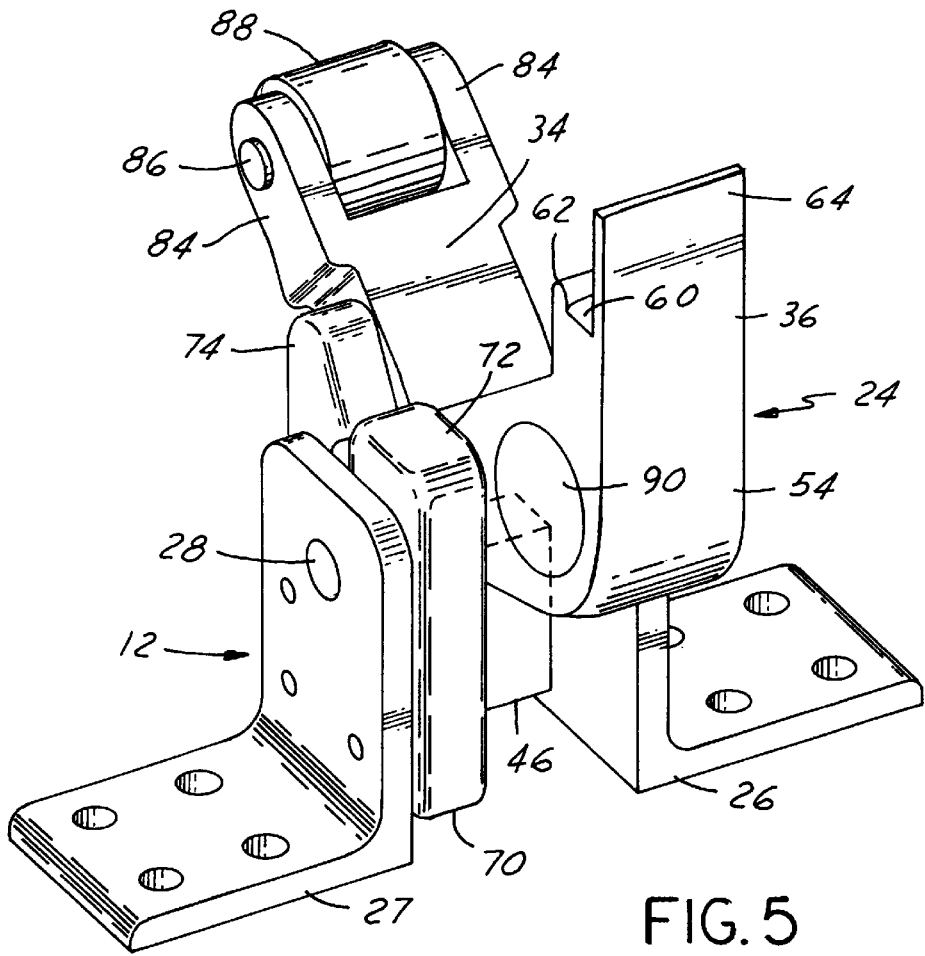
FIG. 5 is a perspective view of one of the rest blocks.
Figure 6:
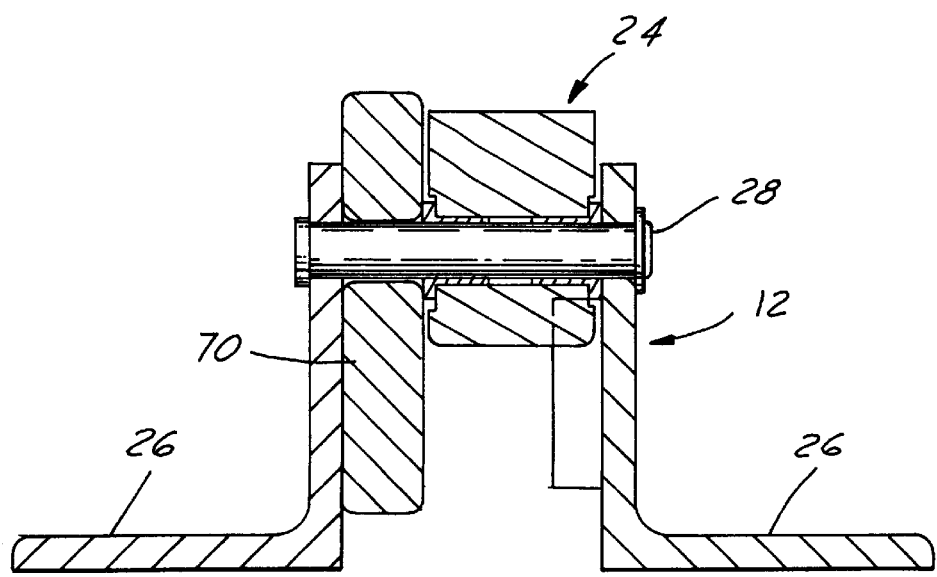
FIG. 6 is a sectional view of the rest block shown in FIG. 5.

An operator will then place the much lighter door trim panel 18 against the inner surface of the primary door panel as shown in FIG. 2 with the lower edge portion of the door trim panel supported on the shelf 60 of the rocker arm. This can be done manually because the door trim panel is relatively light in weight. The operator may then install the various components between the primary door panel 16 and the door trim panel 18 and also apply the necessary fasteners to secure the two panels together.

What is claimed is:

1. Apparatus for supporting a primary automotive door panel and a door trim panel during a manufacturing process comprising:

at least one rest block, said rest block including a rocker having first and second arms extending radially outwardly from a common pivot axis at an angle to one another and perpendicular to said pivot axis such that adjacent surfaces of said arms form a radially outwardly opening recess, means supporting said rocker for pivotal movement about said pivot axis from a loading position in which said recess opens laterally to a work-supporting position in which said recess opens upwardly, the inner surfaces of said arms meeting adjacent said pivot axis to define a notch adapted to support a lower edge portion of the primary door panel when said rocker is in said work-supporting position, a first one of said arms having a shelf adapted to support the trim panel in contact with the primary door panel when said rocker is in said work-supporting position; and cushion means comprising a roller of a soft, non-abrasive material on a second one of said arms adapted to be contacted by said primary door panel when said primary door panel is moved laterally toward said rocker to pivot said rocker from the loading position to the work-supporting position.

2. Apparatus as defined in claim 1, further including stop means for preventing pivotal movement of said rocker beyond said loading position and said work-supporting position.

3. Apparatus as defined in claim 1, further including weighted means on said rocker for biasing said rocker to the loading position.

4. Apparatus for supporting a primary automotive door panel and a door trim panel during a manufacturing process comprising a pair of rest blocks, each of said rest blocks including:

1) a rocker having first and second arms extending radially outwardly from a common pivot axis at an angle to one another and perpendicular to said pivot axis such that adjacent surfaces of said arms form a radially outwardly opening recess, 2) means supporting said rocker for pivotal movement about said pivot axis from a loading position in which said recess opens laterally to a work-supporting position in which said recess opens upwardly, 3) the inner surfaces of said arms meeting adjacent said pivot axis to define a notch adapted to support a lower edge portion of the primary door panel when said rocker is in said work-supporting position, and 4) a first one of said arms having a shelf adapted to support the trim panel in contact with the primary door panel when said rocker is in said work-supporting position, and
5) stop means for preventing pivotal movement of said rocker beyond said loading position and said work-supporting position, said rest blocks being laterally spaced apart with their pivot axes in alignment.

5. Apparatus as defined in claim 4, wherein the rocker of each of said rest blocks has a roller of a soft, non-abrasive material on a second one of the arms thereof adapted to be contacted by the primary door panel when said primary door panel is moved laterally toward said rocker to pivot said rocker from the loading position of the work-supporting position.

6. Apparatus as defined in claim 5, further included weighted means on each of said rockers biasing said rocker to the loading position.

7. Apparatus as defined in claim 6, wherein the shelf of each of said rockers is provided on an outer end portion of said first one of said arms thereof, and outward extensions on the outer end portion of said first one of said arms to locate the trim panel on said shelf.

8. Apparatus as defined in claim 7, further including a stationary support positioned alongside the rocker of each of said rest blocks and having a second notch registering with the notch in said rocker when said rocker is in the work-supporting position thereof to assist the rocker in supporting the lower edge portion of the primary door panel.

9. Apparatus as defined in claim 8, wherein the stationary support of each of said rest blocks has guiding surfaces to guide the lower edge portion of the primary door panel into said second notch.

10. Apparatus as defined in claim 9, wherein, in the loading position of the rocker of each of said rest blocks, said first one of the arms thereof extends generally horizontally and the second one of the arms thereof extends upwardly.

11. Apparatus as defined in claim 10, wherein the range of pivotal movement of the rocker of each of said rest blocks from the loading position to the work-supporting position is 120°–140°.

12. Apparatus for supporting a primary automotive door panel and a door trim panel during a manufacturing process comprising:

at least one rest block, said rest block including a rocker having first and second arms extending radially outwardly from a common pivot axis at an angle to one another and perpendicular to said pivot axis such that adjacent surfaces of said arms form a radially outwardly opening recess, means supporting said rocker for pivotal movement about said pivot axis from a loading position in which said recess opens laterally to a work-supporting position in which said recess opens upwardly, the inner surfaces of said arms meeting adjacent said pivot axis to define a notch adapted to support a lower edge portion of the primary door panel when said rocker is in said work-supporting position, a first one of said arms having a shelf adapted to support the trim panel in contact with the primary door panel when said rocker is in said work-supporting position; and a stationary support positioned alongside said rocker having a second notch registering with the notch in said rocker when said rocker is in the work-supporting position thereof to assist the rocker in supporting the lower edge portion of the primary door panel.

* * * * *